United States Patent [19]

Nakamura et al.

[11] Patent Number: 5,016,362
[45] Date of Patent: May 21, 1991

[54] COFFEE BEAN ROASTING DEVICE

[75] Inventors: Akihiko Nakamura, Nagoya; Takashi Ito, Okazaki, both of Japan

[73] Assignees: NGK Insulators, Ltd.; Pokka Corporation, both of Aichi, Japan

[21] Appl. No.: 537,148

[22] Filed: Jun. 12, 1990

Related U.S. Application Data

[63] Continuation of Ser. No. 404,407, Sep. 8, 1989, abandoned.

[30] Foreign Application Priority Data

| Sep. 13, 1988 | [JP] | Japan | 63-119985[U] |
| Sep. 13, 1988 | [JP] | Japan | 63-119986[U] |
| Sep. 13, 1988 | [JP] | Japan | 63-119987[U] |
| Mar. 29, 1989 | [JP] | Japan | 1-36990[U] |

[51] Int. Cl.$^5$ ............................. F26B 19/00
[52] U.S. Cl. ............................. 34/51; 34/63; 34/60; 34/129
[58] Field of Search ............ 99/286, 470; 34/51, 34/63, 66, 130, 131, 132, 133, 62, 129

[56] References Cited

U.S. PATENT DOCUMENTS

| 2,572,678 | 10/1951 | Torres | 34/63 X |
| 2,716,936 | 9/1955 | Kopf | 34/63 X |
| 2,874,483 | 2/1959 | Brandl | 34/51 X |
| 4,048,473 | 9/1977 | Burkhart . | |
| 4,325,191 | 4/1982 | Kumagai et al. . | |
| 4,691,447 | 9/1987 | Nakai et al. . | |
| 4,860,461 | 8/1989 | Tamaki et al. . | |

Primary Examiner—Henry A. Bennett
Attorney, Agent, or Firm—Parkhurst, Wendel & Rossi

[57] ABSTRACT

A coffee bean roasting device includes a heating oven and a roasting drum in the heating drum, infrared heaters attached to inner walls of the heating oven, and a cooling drum provided under the roasting drum. The device further includes agitating blades spirally provided on inner walls of the roasting drum and the cooling drum and having smooth inner circumferential edges, a suction blower for sucking air in either of the drums, an exhaust passage for exhausting burnt gases produced in the roasting drum out of the device, a pressure sensor provided in a passage from an opening of the roasting drum to the exhaust passage, a pressure regulating device for regulating pressures in the roasting drum with the aid of differences between pressures detected by the pressure sensor and atmospheric pressure, a temperature sensor provided on an inner wall of the heating oven in opposition to the roasting drum, and a water spray nozzle for spraying water into the roasting drum through its opening.

8 Claims, 8 Drawing Sheets

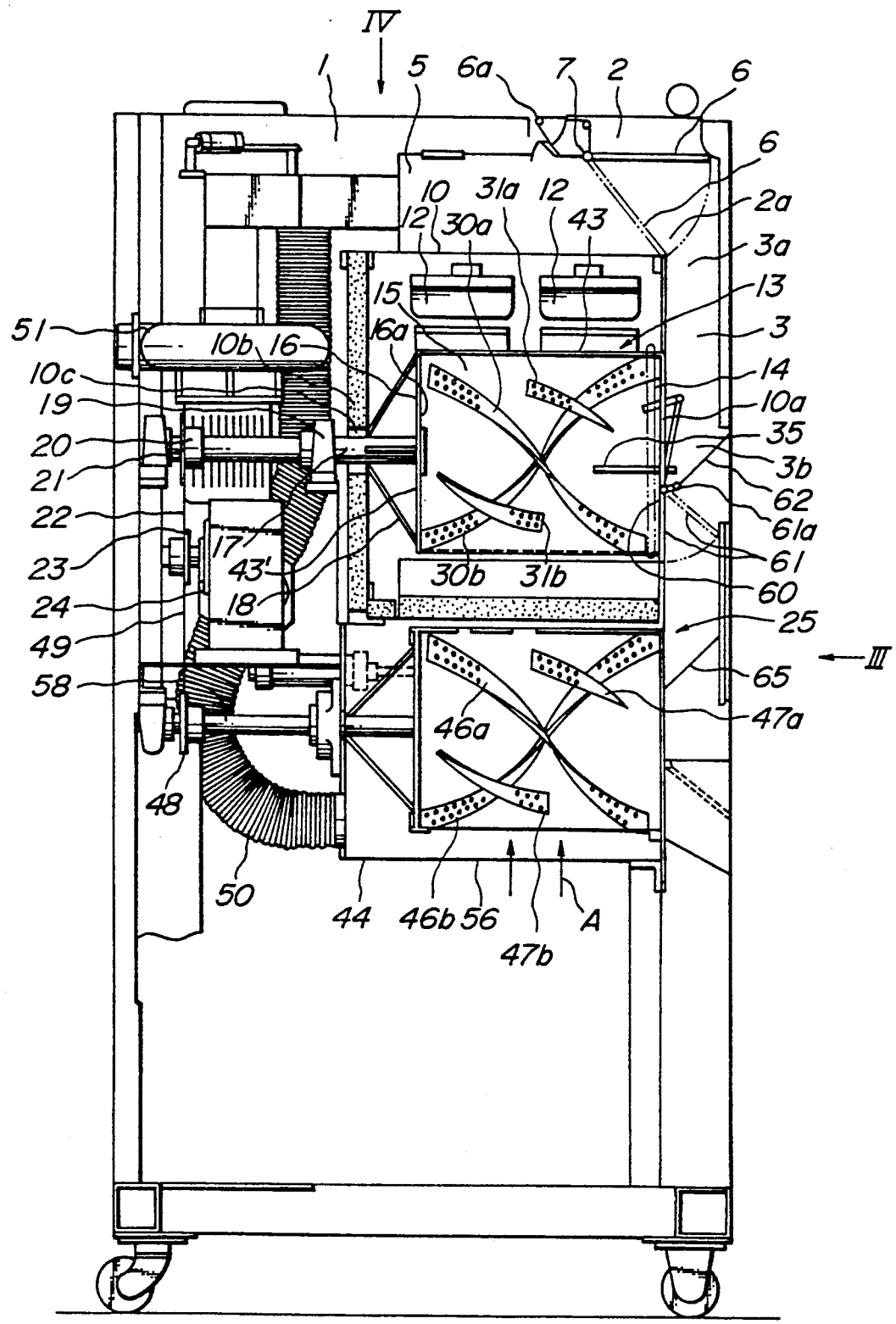
FIG_2

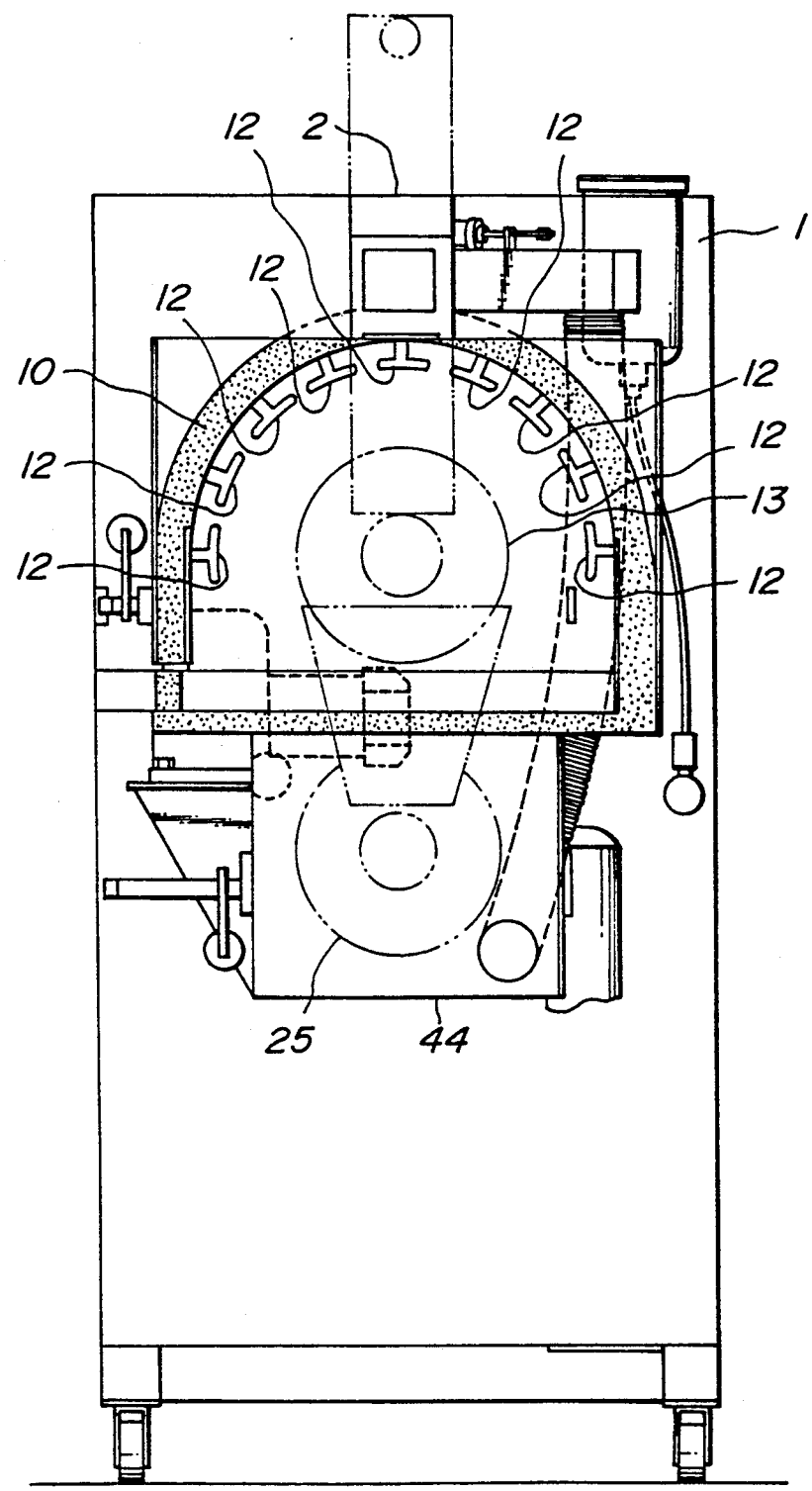

FIG_4
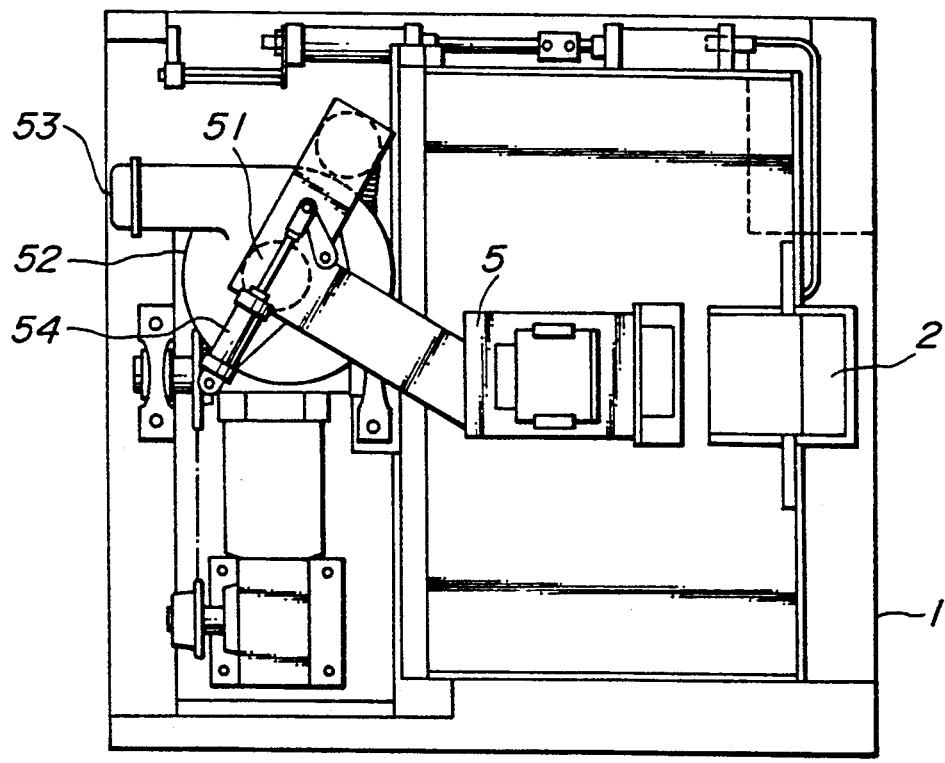

FIG_8
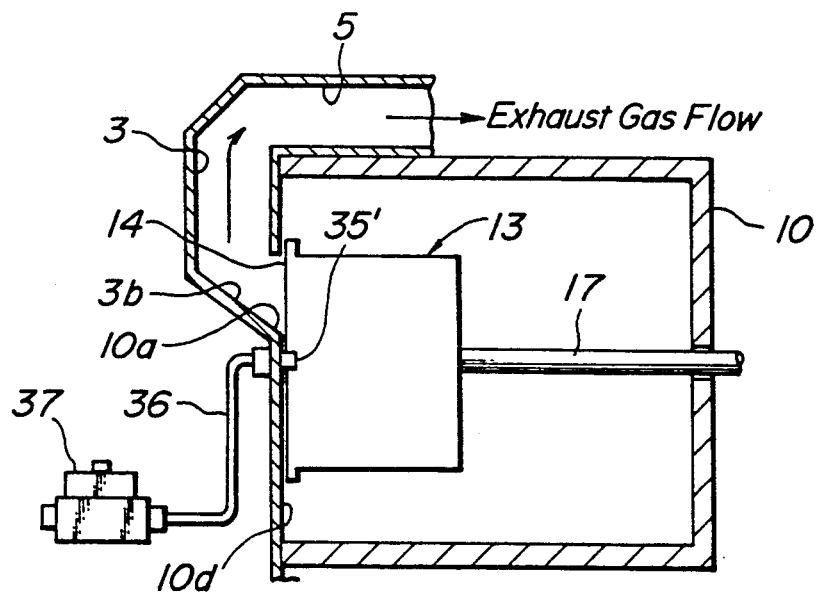
FIG_9
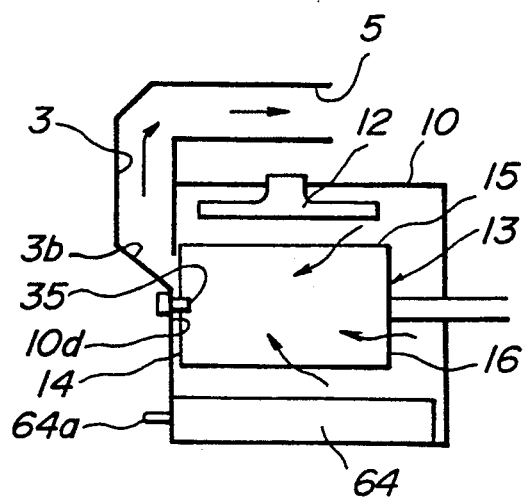

FIG_10
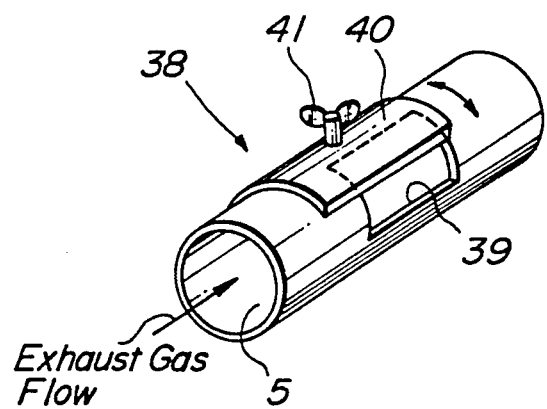
FIG_11
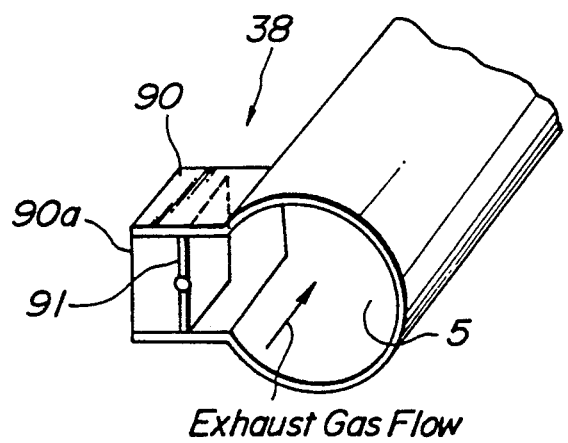

FIG_12
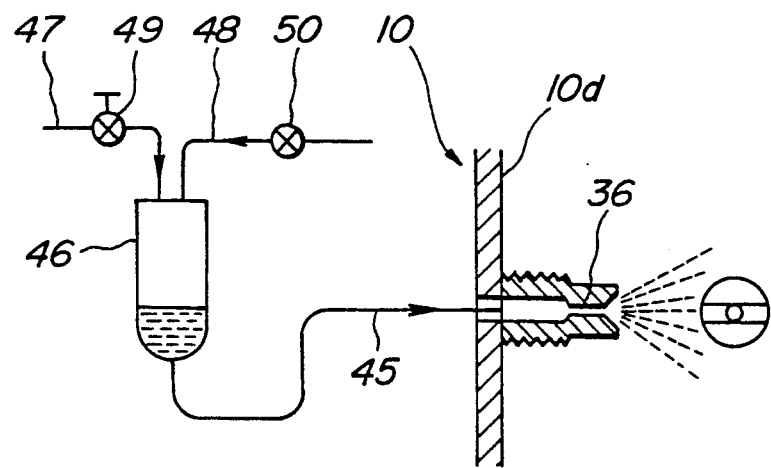

5,016,362

COFFEE BEAN ROASTING DEVICE

This is a continuation of application Ser. No. 07/404,407 filed Sept. 8, 1989, now abandoned.

BACKGROUND OF THE INVENTION

This invention relates to a coffee bean roasting device for roasting coffee beans and the like.

In heating and conditioning coffee beans, good flavor, smell and the like of coffee are generally obtained by rapidly cooling the coffee beans after they have been heated (roasted). In this case, it is the most important factors how to set roasting temperature and time, cooling characteristics after roasting and the like in order to improve quality of the roasted coffee beans.

A coffee bean roasting device has been known having bar-like heaters for heating coffee beans as disclosed in Japanese Utility Model Application Publication No. 63-17,356. Another coffee bean roasting device has also been known wherein coffee beans are offset onto one side in a roasting drum and roasted as disclosed in Japanese Utility Model Application Publication No. 60-41,117.

With these devices of the prior art, however, coffee beans are generally insufficiently agitated in a roasting drum so that they are subjected to less radiation from heaters. In case of the offset coffee beans in the drum, the roasting is so insufficient that it takes undue long time for complete roasting.

In the device of the prior art, moreover, as the heating means are bar-like heaters, it is difficult to heat the coffee beans from their circumference uniformly and without exception. It is furthermore difficult to make the coffee beans be sufficiently subjected to convection heat in the drum.

In order to agitate coffee beans sufficiently in a drum to make the roasting progress uniformly, it has been proposed to provide agitating blades in the from of thin plates on inner circumferential walls of the drum. The coffee beans are roasted by radiation from infrared heaters while being agitated by the blades in this manner.

However, as the blades are generally made of punching plates whose edges 8 have notches 8a, during roasting the notches 8a of the blades bite the coffee beans being agitated by the blades as shown in FIG. 1. Therefore, some coffee beans are split by the notches and the beans held by the notches are over-heated and burnt to cause smoking and firing.

In the devices of the prior art, burnt gases produced in a drum are exhausted out of the device by means of circulation fans or by natural draft through exhaust ports communicating with the inside of the drum.

With the device using the circulation fan, means for regulating rotating speeds of the fan is separately needed so that the device becomes complicated and expensive. In the device using the natural draft, amounts of the exhaust gases cannot be adjusted so that roasted coffee beans include smell of smoke. Moreover, in case that chaffs of coffee beans remain in the drum, such residues frequently make smoky the roasted coffee beans.

In general, moreover, when the negative pressure in the roasting drum is slight, the burnt gases are likely to remain in the roasting drum and peeled chaffs tend to remain in the roasted coffee beans so that the roasted coffee beans often becomes smoky. On the other hands, when the exhaust gases in the drum are intensively exhausted, the negative pressure in the drum becomes higher. As a result, good smell and flavor of the coffee beans are carried away by the exhaust gases forced out of the device.

With an device hitherto used, moreover, when the roasting has been completed, further progress of roasting is arrested only by shutting off the heat sources as disclosed in Japanese Patent Application Laid-open Nos. 56-72,678 and 56-72,679. In other device, a roasting section is tilted by a tilting mechanism so as to exhaust the roasted coffee beans into an external cooling section to promote the cooling of the roasted coffee beans as disclosed in Japanese Patent Laid-open No. 61-199,777.

With such a hitherto used device whose heat sources are adapted to be shut off when the roasting is finished, there is a risk of roasting unduly progressing due to thermal inertia in an oven after the roasting has been completed. In the device whose roasting section is adapted to be tilted, there are irregularities in progress of the roasting and a driving mechanism is needed to tilt the roasting section to make the device complicated.

SUMMARY OF THE INVENTION

It is an object of the invention to provide an improved coffee bean roasting device capable of improving heat-receiving effect of coffee beans by causing part of coffee beans to flow upwardly in a roasting drum and remaining coffee beans to be axially uniformly spread and distributed, effectively giving radiation heat from heating means together with convection heat to the coffee beans by providing heating means surrounding the roasting drum and rapidly cooling the roasted coffee by means of a cooling drum provided below the roasting drum, thereby obtaining uniformly roasted coffee beans without any unevenness by roasting for a short period of time.

It is another object of the invention to provide a coffee bean roasting device having agitating blades which do not bite coffee beans to avoid splitting of the beans, smoking and firing and are able to sufficiently agitate coffee beans in drums to promote uniform roasting in conjunction with radiation heat from the heating means.

It is a further object of the invention to provide a coffee bean roasting device capable of adjusting exhaust amounts of burnt gases in the roasting drum by the use of means simple in construction to obtain roasted coffee beans having good flavor, smell and the like and less smell of smoking.

It is an object of the invention to provide a coffee bean roasting device capable of detecting progress of the roasting of coffee beans by means of a temperature sensor and restraining the progress by a primary cooling with water spraying to obtain roasted coffee beans without irregularity in roasting.

In order to achieve these objects, a coffee bean roasting device according to the invention comprises a heating oven formed by a heat insulating material, a roasting drum in the form of a bottomed cylinder formed with a number of small apertures and rotatably provided in the heating oven, infrared heating means attached on inner walls of the heating oven to surround the roasting drum for heating it, a cooling drum in the form of a bottomed cylinder formed with a number of small apertures and connected with a rotating shaft of the roasting drum through interlocking means, agitating blades spirally provided on inner walls of the roasting drum and the cooling drum and having smooth inner circumferential edges, a suction blower for sucking air in either of the roasting drum and the cooling drum, an exhaust passage for exhausting burnt gases produced in the roasting drum out of it, a pressure sensor provided in a passage from an opening of the roasting drum to the exhaust passage, pressure regulating means for regulating pressures in the roasting drum with the aid of differences between pressures detected by the pressure sensor and atmospheric pressure, a temperature sensor provided on an inner wall of the heating oven in opposition to the opening of the roasting drum, and a water spray nozzle for spraying water into the roasting drum through its opening.

With this arrangement, part of coffee beans is flown upwardly in the roasting drum in the form of a bottomed cylinder formed with a number of small apertures, while the remaining coffee beans are axially uniformly spread and distributed so that the coffee beans are effectively subjected to radiation from the infrared heaters surrounding the roasting drum from the above. Negative pressure is caused in the roasting drum by a suction blower to promote thermal convection so that the roasting of the coffee beans is uniformly effected for a short period of time. The roasted coffee beans are then cooled in the cooling drum provided below the roasting drum and in the form of bottomed cylinder having a number of small apertures.

Moreover, the inner circumferential edges of the agitating blades provided in the drums are made to be smooth surface so that the edges of the blades do not penetrate into the coffee beans when they are agitated by the blades. Therefore, the coffee beans are reciprocatingly moving in axial directions of the drums to be sufficiently agitated.

In the prior art, agitating blades often bite coffee beans to split them and the beans held by the blades penetrated thereinto are over-heated and burnt to cause smoking and firing. According to the invention, however, such problems, splitting, burning, smoking, firing and the like are eliminated. Therefore, uniform roasting of coffee beans can be carried out by the sufficient agitation of the coffee beans in conjunction with the radiation emitted from the heating means.

According to the invention, the pressure in the roasting drum is regulated by the pressure regulating means on the basis of pressure differences between the detected pressures by the pressure sensor and the atmospheric pressure. Therefore, the pressure in the roasting drum can be set according to the kinds of coffee beans and extents of roasting.

Accordingly, it becomes possible to adjust the pressure in the roasting drum according to the degree of roasting to obtain roasted coffee beans having good flavor, smell and the like and less smoking smell.

Moreover, according to the invention roasting temperature of coffee beans is detected in the roasting drum by means of the temperature sensor and water supply means is actuated on the basis of the detected temperature to jet sprayed water from the spray nozzle over the coffee beans in the roasting drum. The roasted coffee beans are thus uniformly and rapidly cooled.

Such a primary cooling serves to tighten outer surfaces of the roasted coffee beans to maintain the good quality of the beans such as flavor, smell and the like and to improve the appearance of the beans such as hue, gloss and the like. Therefore, the quality of the coffee beans after the primary cooling is more improved by the following second cooling.

The invention will be more fully understood by referring to the following detailed specification and claims taken in connection with the appended drawings.

BRIEF DESCRIPTION OF THE DRAWINGS

FIG. 2 is a sectional view schematically illustrating one embodiment of the device according to the invention;

FIG. 3 is a front elevation of the device viewed in the direction shown by an arrow III;

FIG. 4 is a plan view of the device viewed in the direction shown by an arrow IV;

FIGS. 8 and 9 are schematic sectional views illustrating a pressure sensor and parts thereabout used in the device according to the invention;

FIG. 10 is a partial perspective view illustrating pressure regulating means used in the device according to the invention;

FIG. 11 is a perspective view illustrating another embodiment of the pressure regulating means showing a principal part in section; and FIG. 12 is a schematic view illustrating a supply system for supplying water to be sprayed from the water spray nozzle.

DESCRIPTION OF THE PREFERRED EMBODIMENTS

Figure 1:
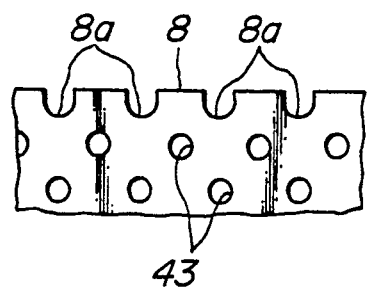
FIG. 1 is a view illustrating an agitating blade of the prior art.

As shown in FIGS. 2-4 illustrating one embodiment of the invention, a coffee bean roasting device comprises a funnel-shaped hopper 2 arranged on an upper portion of a frame 1 of the device for supplying a batch of coffee beans to be heated. A passage of the hopper 2 formed by its inner circumferential surfaces is narrowed downwardly from a midway of the passage, and it lower end 2a is connected to an upper end 3a of a coffee bean passage 3.

The coffee bean passage 3 vertically extends over a certain length but is bent at a midway to form an inclined passage 3b whose lower end opens at an oven end opening surface 10a of a heating oven 10 later described. On the other hand, an exhaust passage 5 is branched off the coffee bean passage 3 at its upper end and extends horizontally rearwardly (on the left side in FIG. 2). A shutter 6 is pivotally connected to the branched portion rockably about a pivoted point 7 by means of a shutter lever 6a for selectively exchanging two operations of charging coffee beans and exhausting gases.

In the heating oven 10 is provided a roasting drum 13 in the form of a bottomed cylinder arranged in a manner that a rotating axis directs a horizontal direction. An opening surface 14 of the roasting drum 13 is arranged facing to and in parallel with the oven end opening surface 10a of the heating oven 10 with a clearance. The clearance is adjusted for example within a range 1-2 mm. The adjustment is so effected to prevent the coffee beans from falling through the clearance, when the coffee beans from the inclined passage 3b are fed through the oven end opening surface 10a and the opening surface 14 into the roasting drum 13.

A cylindrical body 15 of the roasting drum 13 is made of a punching metal which is formed with a number of small apertures 43, for example, circular apertures having sizes through which the coffee beans could not pass. A bottom disc 16 of the roasting drum 13 is made of a punching metal disc formed with a number of small apertures 43 communicating the outside with the inside of the drum 13. An opening ratio of the number of the small apertures 43 formed in the cylindrical body 15 and the bottom disc 16 is within a range of 20-70%. The reason why such an opening ratio is used is that while promoting the heating of the coffee beans, the heat is caused pass through the small apertures to adjust the heating of the coffee beans in order to prevent surfaces of the coffee beans from hardening due to excessive radiation heat from the infrared heater 12 having a plate-like heating element of a nichrome wire embedded in a ceramic member before completely driving moisture and carbonic acid gas from the coffee beans.

Two feeding blades 30a and 30b in the form of thin stripes having a predetermined width are spirally arranged on an inner circumferential wall of the cylindrical body 15 at positions shifted 180° with each other with respect to an axis of the drum 13 for feeding the coffee beans supplied through the opening surface 14 onto the side of the bottomed disc 16 when the drum 13 is being rotated. Moreover, two return blades 31a and 31b in the form of thin stripes are arranged on the inner circumferential wall of the cylindrical body 15 in direction intersecting with the feeding blades 30a and 30b for feeding the coffee beans supplied in the drum 13 toward the opening surface 14 when the drum 13 is being rotated. The feeding blades 30a and 30b and the return blades 31a and 31b are formed with a number of small apertures.

A driving shaft 17 extending into the roasting drum 13 is fixed to a boss 16a of the bottomed disc 16 of the roasting drum 13. The driving shaft 17 is provided at a mid portion with spokes 18 radially extending and having outer ends fixed to an outer periphery of the cylindrical body 15. The roasting drum 13 is thus fixed to and supported by the driving shaft 17 by means of the spokes 18.

The driving shaft 17 fixed to the roasting drum 13 passes through an opening 10c of the oven end closed surface 10b and is rotatably supported by means of bearings 19 and 20. An outer end of the driving shaft 17 is fitted with a sprocket 21 outwardly of the bearing 20. The sprocket 21 is driven by a chain 22 extending about the sprocket 21 and a sprocket 23 driven by a driving motor 24.

A number of infrared heaters 12 are arranged on an inner circumferential surface of the heating oven 10 so as to surround the roasting drum. Each of the heaters 12 has a plate-like heating element extending in an axial direction of the heating oven 10 and the made of such as a nichrome wire embedded in a ceramic member. The heaters 12 are preferably arranged to surround approximately upper two thirds of the roasting drum 13 without surrounding the lower portion of the roasting drum 13. The reason why the heater are not arranged under the roasting drum 13 is to avoid husks and chaffs of the coffee bean from falling through the apertures of the punching metals onto the heaters and to avoid contamination of the infrared heaters with the fallen husks and chaffs and nasty smell resulting from burning of them on the heaters.

When the infrared heaters 12 are actuated, the coffee beans are sufficiently subjected to the infrared radiation through the small apertures of the rotating roasting drum 13 in conjunction with the agitating action of the agitating blades. In most cases, there is a tendency for moisture and carbonic acid gases produced from the coffee beans with proceeding of heating to form boundary films at surfaces of the coffee bean to make its inner portions remain in non-roasted condition. According to the invention, as the infrared radiation sufficiently acts on the coffee beans, while being agitated, such a formation of the boundary films and the non-roasted condition can be completely prevented.

The heating oven 10 is provided immediately below its oven end opening surface 10a with a temperature sensor 35 on an inner oven end wall opposing to the opening surface 14 of the roasting drum 13.

The heating oven 10 is also provided at a lower portion of the oven end opening surface 10a with an exhaust opening 60 for exhausting the coffee beans which have been roasted. An exhaust door 61 is pivotally connected to the exhaust opening 60 to be pivotally closed and opened about a pivot axis 61a by an actuation of a lever 62. An exhaust shoot 65 downwardly inclined is fixed to the exterior of the exhaust opening 60 for feeding the roasted coffee beans into a cooling drum 25 later described.

The cooling drum 25 is positioned immediately below the roasting drum 13 and arranged in a casting 44 whose axis is in parallel with an axis of the cooling drum 25. The cooling drum 25 is similar in construction to the roasting drum 13 and has feeding blades 46a and 46b and return blades 47a and 47b therein. When the cooling drum 25 is being rotated, the feeding blades 46a and 46b feed the coffee beans to the left viewed in FIG. 1 and the return blades 47a and 47b feed the beans to the right. The cooling drum 25 is driven through a driving shaft 58, a sprocket 48 and a chain 49 by the driving shaft 17.

The casing 44 is connected through a hose 50 to a suction blower 51 and opens at an exhaust opening 53 (FIG. 4). A duct switching-over valve 54 is provided in the proximity of a suction opening of the suction blower 51.

When the duct switching-over valve 54 is switched onto a cooling side, the air in the casing 44 housing the cooling drum 25 is exhausted through the hose 50 and the exhaust opening 53 out of the device. In this case, negative pressure is caused in the casing 44 so that husks and chaffs of coffee bean fallen through apertures of the cooling drum 25 onto a bottom plate of the casing 44 are sucked and exhausted. Moreover, such a suction also serves to cool the coffee beans.

On the other hand, when the duct switching-over valve 54 is switched onto a roasting drum side, exhaust gases, produced in the roasting drum 13 when roasting, rise through the opening surface 14 along the inclined passage 3b, the coffee bean passage 3 and the exhaust passage 5 connected thereto. The exhaust gases are then sucked by a blower 51 provided downstream of the exhaust passage 5 and exhausted out of the device.

The operation of the device according to the embodiment above described will be explained hereinafter.

Coffee beans supplied into the hopper 2 is fed through the coffee bean passage 3, the inclined passage 3b and the opening surface 10a into the roasting drum 13.

When the roasting drum 13 is rotated, the coffee beans in the roasting drum 13 are heated or roasted by the radiation from the infrared heaters 12, while being agitated by the feeding and return blades 30a, 30b, 31a and 31b.

During such operations, part of the coffee beans in the roasting drum 13 is flown about in the space in the drum and the remaining part of the batch is forced onto the side of the bottomed disc 16 by means of the feeding blades 30a and 30b and at the same time onto the side of the opening surface 14 by means of the return blades 31a and 31b. Therefore, the coffee beans are reciprocatingly moved in axial directions of the drum to be uniformly agitated and distributed, while part of the batch is flown upwardly so that the coffee beans are uniformly subjected to the radiation from the infrared heaters with ease. Accordingly, the roasting of the coffee beans is uniformly accomplished for a short period of time.

Upon termination of the roasting, the lever 61 is moved into a position shown in phantom lines in FIG. 1 so that the coffee beans which have been roasted in the roasting drum 13 is transferred through the exhaust opening 60 and along the exhaust shoot 65 into the cooling drum 25.

The coffee beans in the cooling drum 25 separated from the atmosphere out of the device by the casing 44 are partly flown about in the space in the cooling drum 25 and uniformly distributed in axial directions of the cooling drum 25 by means of the feeding and return blades 46a, 46b, 47a and 47b. During such operations, husks and chaffs remaining in the roasted coffee beans fall through the small apertures in the drum onto the bottom plate 56. Such husks and chaffs on the bottom plate 56 are forced out of the device with the aid of the suction force of the suction blower 51. Moreover, the flowing air is flown about by the agitating blades or the heat in the coffee beans axially distributed is absorbed by the flowing air which is then exhausted through the hose 50, the blower 51 and the exhaust opening 53 out of the device. Therefore, the coffee beans are rapidly cooled without sucking and contacting the atmosphere so that moisture and nasty smell in the atmosphere hardly adsorb on surfaces of the coffee beans.

Figure 5:
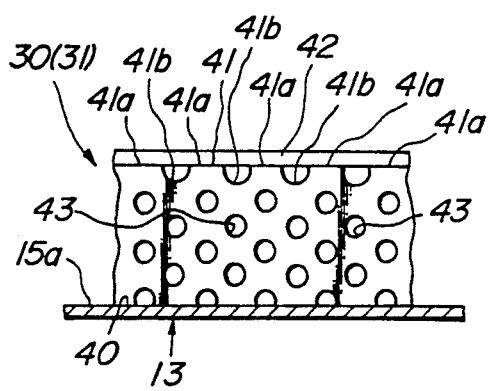
FIG. 5 is a view schematically illustrating one embodiment of the blades used in the device according to the invention.

According to the invention, as shown in FIG. 5 each of the feeding blades 30a and 30b and return blades 31a and 31b is provided on its inner circumferential edge with a circular sectional bar 42 so that shocks caused by the coffee beans are reduced to avoid the blades from biting the coffee beans. Therefore, the coffee beans are sufficiently agitated to prevent baking, smoking and firing.

Figure 6:
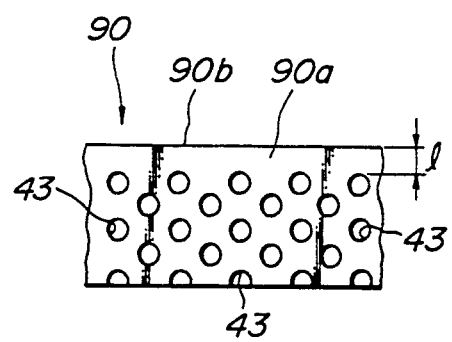
FIG. 6 is a view schematically illustrating a second embodiment of the blades.

FIG. 6 illustrates a constitution of a feeding blade or a return blade according to a second embodiment of the invention. In this embodiment, a punching plate 90 to be used for the blade is formed with a number of apertures except an area 90a in the proximity of an inner circumferential edge. The area 90a having no apertures has a width l. An edge 90b of the area 90a is so smooth that it does not penetrate into the coffee beans impinging thereat.

Figure 7:
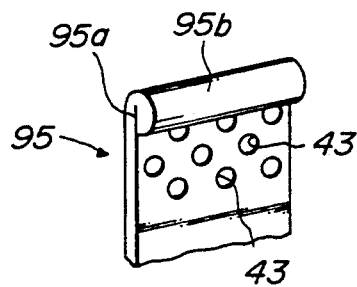
FIG. 7 is a view schematically illustrating a third embodiment of the blades.

FIG. 7 illustrates a constitution of a feeding blade or a return blade according to a third embodiment of the invention. In this embodiment, an inner circumferential edge of a punching plate 95 is folded upon itself to form a folded portion 95a. The folded portion 95a forms a smooth curved surface 95b so that the edge does not penetrate into coffee beans impinging thereat. In this embodiment, the prevention of penetration of the blade into coffee beans is accomplished by a simple operation of bending the inner circumferential edge of the punching plate 95.

According to the invention, as shown in FIGS. 8 and 9 the heating oven 10 is provided immediately below its oven end opening surface 10a with a pressure sensor 35' such as a pitot tube on an inner oven end wall opposing to the opening surface 14 of the roasting drum 13 for detecting the pressure in the roasting drum 13. For the sake of clarity the pressure sensor is omitted in FIG. 1. The pitot tube used in the embodiment is made of a heat-resistant stainless steel and has an outer end connected to one end of a pressure pipe 36 having the other end connected to a differential pressure gauge 37.

The pressure sensor may be any type of pressure sensors other than the pitot tube and may be positioned at the inclined passage 3b, the coffee bean passage 3 or exhaust passage 5 but only insofar pressures depending upon the pressures in the roasting drum can be detected.

Moreover, a pressure regulating means 38 is provided in a pipe upstream of the blower 51 in the exhaust passage 5. As shown in FIG. 10, the pressure regulating means 38 includes a part of a pipe constituting the exhaust passage 5 formed with an opening 39. A lid 40 is provided to be fixed to the pipe by means of a set screw 41 so as to be able to adjust opening areas of the opening 39. An operator moves the lid 40 to adjust opening degree of the opening 39 according to pressures read in the differential pressure gauge 37 and roasted conditions of the coffee beans. The exhaust gases are suitably exhausted in this manner to adjust the pressure in the roasting drum 13.

A sampler mounting aperture may be formed in one wall of the heating oven 10 for detachably mounting a sampler for observing degrees of roasting of the coffee beans in the roasting drum 13.

Pressure regulating means as shown in FIG. 11 may be provided instead of that illustrated in FIG. 10. In this embodiment, a part of a pipe forming the exhaust passage 5 is provided with an air receiving cylinder 90 in which is provided a rotatable damper 91 for adjusting amounts of the air to be introduced into the exhaust passage. In this case, the damper 91 may be moved by a driving motor (not shown) to adjust degrees of opened area 90a on the basis of outputs of the differential pressure gauge 37.

The temperature sensor 35 is provided immediately below the oven end opening 10a on the inner oven end wall opposing to the opening surface 14 of the roasting drum 13 as already mentioned. Moreover, a water spray nozzle 36 is provided in the inner oven end wall in symmetry with the temperature sensor 35.

The temperature sensor 35 detects the roasting temperature of the coffee beans in the roasting drum 13 to adjust timing of water spray by means of the water spray nozzle 36. The temperature sensor 35 comprises for example a sheath thermocouple of a chromel-alumel wire. Tip ends of the temperature sensor 35 are so designed that coffee beans are not damaged even they contact the tip ends of the sensor 35.

The temperature sensor 35 provided at the oven end according to the invention may of course be of any types other than the thermocouple. Moreover, the sensor 35 may provided at any suitable position according to a diameter and revolutions per minute of the roasting drum 13, and amounts and agitated conditions of the coffee beans and the like.

As shown in FIG. 12, the water spray nozzle 36 is mounted on the inner oven end wall 10d of the heating oven 10 and its upstream end is connected through a line 45 to a water tank 46. To an upstream end of the water tank 46 are connected a water pipe 47 having a solenoid valve 49 and an air pipe 48 having a solenoid valve 50. When the solenoid valve 49 of the water pipe 47 is opened, water is supplied into the water tank 46. When the solenoid valve 49 is closed and the solenoid valve 50 is opened, compressed air is supplied through the air pipe 48 into the water tank 46 to raise the pressure in the tank. The raised pressure in the tank 46 causes the water arrived through the line 45 at the nozzle 36 to spray into the roasting drum 17 therefrom. A direction and a position of the nozzle 36 and spray pressure are so set that the sprayed water is jetted from the nozzle 36 as a mist and uniformly sprinkled over the coffee beans in the drum 13. The air pressure through the solenoid valve 50 is preferably 4–6 kg/cm$^2$. The coffee beans are uniformly cooled by sprinkling the spray water in the form of a sufficient mist in conjunction with the agitation of the coffee beans by the rotation of the drum 13.

The operation of the temperature sensor 35 and the water spray nozzle 36 will be explained. Before termination of the roasting the solenoid valve 49 is opened to start supplying of water into the water tank 46. An amount of water corresponding to the amount of the coffee beans in the drum has been supplied, the solenoid valve 49 is closed.

When the temperature sensor 35 has detected a roasting temperature in the drum, for example, 210° C., the air solenoid valve 50 is opened with the aid of a detected signal from the temperature sensor 35 so that compressed air of 4–6 kg/cm$^2$ is instantaneously supplied through the air pipe 48 into the water tank 46. As a result, a mixture of the air and the water in the tank 46 is fed through the line 45 to the nozzle 36 from which the mixture is sprayed as a mist onto the coffee beans in the roasting drum 13.

As a result of the spray of the water onto the coffee beans, the temperature of the coffee beans in the roasting drum 13 falls to a temperature, for example, 160° C. so that the temperature of the coffee beans is rapidly caused to lower to prevent any excess progress of the roasting of the coffee beans. A primary cooling is completed in this manner.

Steam or vapor is produced in the roasting drum 13 when spraying the water. By opening the shutter 6, the steam rises through the opening surface 14, the inclined passage 3b and the coffee bean passage 3 and passes through the exhaust passage 5 connected to the coffee bean passage 3. Thereafter, the steam is exhausted out of the device by the suction of the blower 52.

As above described, according to the invention the temperature sensor can detects the roasting temperature of the coffee beans with reliable reproducibility and the primary cooling is effected by the water spray from the nozzle 35 on the basis of the detected temperature. Therefore, the progress of the roasting of the coffee beans is expeditiously restrained. In conjunction with the effect of the cooling drum, the time required for cooling can be shortened to one half to two thirds of the time required in the prior art.

As can be seen from the above description, according to the coffee bean roasting device of the invention the coffee beans are uniformly spread and distributed and partly flown upwardly by the action of the agitating blades so that the coffee beans are effectively subjected to radiation heat from the infrared heaters surrounding the coffee beans and convection heat in the roasting drum. Therefore, a uniform roasting of coffee beans can be carried out for short time without any unevenness in roasting and without loss of taste and smell.

Moreover, the coffee beans in the cooling drum which have been roasted are flown in the space in the cooling drum and caused to reciprocating movement in the axial directions by means of the agitating blades provided in the cooling drum so that the uniformly distributed coffee beans are rapidly and effectively cooled by an endothermic effect of flowing air by suction blower so that the quality of the coffee beans after roasting such as flavor and smell can be more improved.

According to the invention the inner circumferential edges of the agitating blades provided in the drums are made to be smooth surfaces so that the edges do not penetrate into the coffee beans even the coffee beans impinge against the edges of the blades, thereby preventing the coffee beans bitten by the blades from being burnt with resulting overheating and emitting smoke. Therefore, the coffee beans are sufficiently agitated by the blades in the drums so that the roasting of the coffee beans is effectively carried out in conjunction with the effect of the radiation heat from the heating means to improve the quality of the coffee beans such as flavor, smell and the like.

According to the invention, moreover, the pressure in the roasting drum is adjusted on the basis of detected signals of the pressure sensor after termination of the roasting. Therefore, it becomes possible to set the pressure in the roasting drum to an optimum pressure according to existing roasted conditions so that irregularity in degree of roasting becomes less. Accordingly, the invention can improve the quality of roasted coffee beans such as not only flavor and smell but also appearance such as hue and gloss.

When the roasting has proceeded to an extent, chaffs of coffee beans are generally likely to peel, which remaining in the drum and are bunt to produce smoke and smell of burning. In this case, according to the invention the pressure in the roasting drum is adjusted to force the exhaust gases out of the device to restrained the burning, smoking and firing so that the progress of the roasting is maintained to a suitable extent. If an operator feels the roasting insufficient from the smell, the pressure in the roasting drum is raised so as to promote it to obtain products properly roasted.

According to the invention, moreover, on the basis of the detected signals of the temperature sensor a suitable amount of water is sprayed as mist from the water spray nozzle and distributed over the roasted coffee beans so that the primary cooling after roasting can be rapidly effected, with the result that outer surfaces of the roasted coffee beans are tightened to improve the appearance of the beans such as hue, gloss and the like and the quality of the beans such as flavor, smell and the like.

Moreover, as the roasted coffee beans are cooled by the after spray, the progress of the roasting by thermal inertia is completely arrested. Therefore, the good quality of the coffee beans immediately after the roasting has finished can be maintained and the second cooling process can be properly effected in the cooling drum, thereby more improving the quality of the roasted coffee beans.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A coffee bean roasting device comprising a heating oven formed by a heat insulating material, a roasting drum in the form of a bottomed cylinder formed with a number of small apertures and rotatably provided in the heating oven, infrared heating means attached on inner walls of the heating oven to surround the roasting drum for heating it, a cooling drum in the form of a bottomed cylinder formed with a number of small apertures and connected with a rotating shaft of the roasting drum through interlocking means, agitating blades spirally provided on inner walls of the roasting drum and the cooling drum and having smooth inner circumferential edges, a suction blower for sucking air in either of the roasting drum and the cooling drum, an exhaust passage for exhausting burnt gases produced in the roasting drum out of it, a pressure sensor provided in a passage from an opening of the roasting drum to the exhaust passage, pressure regulating means for regulating pressures in the roasting drum with the aid of differences between pressures detected by the pressure sensor and atmospheric pressure, a temperature sensor provided on an inner wall of the heating oven in opposition to the opening of the roasting drum, and a water spray nozzle for spraying water into the roasting drum through its opening.

2. A coffee bean roasting device as set forth in claim 1, wherein each of the agitating blades is provided with a bar having a circular cross-section to form the smooth inner circumferential edge.

3. A coffee bean roasting device as set forth in claim 1, wherein each of the blades is formed by a punching plate formed with a number of apertures except an area in the proximity of an inner circumferential edge to form said smooth inner circumferential edge.

4. A coffee bean roasting device as set forth in claim 1, wherein an inner circumferential edge of each of the blades is folded upon itself to form said smooth inner circumferential edge.

5. A coffee bean roasting device as set forth in claim 1, wherein a heat-resistant pressure sensor as said pressure sensor is provided on an inner end wall of said heating oven opposing to a surface of the roasting drum formed with said opening.

6. A coffee bean roasting device as set forth in claim 1, wherein said pressure regulating means comprises a part of a pipe forming said exhaust passage formed with an opening and a lid adjustably closing the opening of the pipe.

7. A coffee bean roasting device as set forth in claim 1, wherein said pressure regulating means comprises an air receiving cylinder provided on a pipe forming said exhaust passage and a rotatable damper provided in the air receiving cylinder.

8. A coffee bean roasting device as set forth in claim 1, wherein said water spray nozzle is mounted on an inner end wall of the heating oven and connected to a water tank provided with a water pipe and an air pipe having solenoids, respectively, for controlling supply of water and air to the nozzle.

* * * * *